United States Patent
Berfanger et al.

(10) Patent No.: US 10,893,167 B2
(45) Date of Patent: Jan. 12, 2021

(54) EXTRACTING A DOCUMENT PAGE IMAGE FROM A ELECTRONICALLY SCANNED IMAGE HAVING A NON-UNIFORM BACKGROUND CONTENT

(71) Applicant: Hewlett-Packard Development Company, L.P., Houston, TX (US)

(72) Inventors: David M Berfanger, Vancouver, WA (US); Charles Jia, San Diego, CA (US); Yifeng Wu, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 295 days.

(21) Appl. No.: 16/066,141

(22) PCT Filed: Apr. 28, 2016

(86) PCT No.: PCT/US2016/029832
§ 371 (c)(1),
(2) Date: Jun. 26, 2018

(87) PCT Pub. No.: WO2017/188960
PCT Pub. Date: Nov. 2, 2017

(65) Prior Publication Data
US 2020/0274990 A1    Aug. 27, 2020

(51) Int. Cl.
*H04N 1/407* (2006.01)
*H04N 1/387* (2006.01)
(Continued)

(52) U.S. Cl.
CPC ....... *H04N 1/3871* (2013.01); *G06K 9/00463* (2013.01); *G06K 9/4604* (2013.01);
(Continued)

(58) Field of Classification Search
None
See application file for complete search history.

(56) References Cited

U.S. PATENT DOCUMENTS

| 6,043,900 A | 3/2000 | Feng et al. |
| 6,430,320 B1 * | 8/2002 | Jia ............... G06K 9/32 382/289 |

(Continued)

FOREIGN PATENT DOCUMENTS

WO    WO-2015/179459 A1    11/2015

OTHER PUBLICATIONS

Sofka, M~"On Stable Dynamic Background Generation Technique using Gaussian Mixture Models for Robust Object Detection", AVSS '08~Sep. 2008, 2 pgs.

*Primary Examiner* — Dung D Tran
(74) *Attorney, Agent, or Firm* — Trop Pruner & Hu PC

(57) ABSTRACT

A technique includes acquiring data representing a first image produced by electronically scanning a page against a background. The first image contains a non-uniform background content due at least in part to a variation introduced by the background being non-uniform. The technique includes extracting an image of the page from the first image, wherein the extraction includes characterizing the background content of the first image; identifying candidate pixels associated with the page based at least in part on the characterized background content; and based at least in part on the identified candidate pixels and a model for a boundary of the page, determining the boundary of the page.

14 Claims, 10 Drawing Sheets

(51) Int. Cl.
*G06K 9/00* (2006.01)
*G06K 9/46* (2006.01)
*H04N 1/393* (2006.01)
*H04N 1/00* (2006.01)

(52) U.S. Cl.
CPC ......... *H04N 1/3872* (2013.01); *H04N 1/3935* (2013.01); *H04N 1/00816* (2013.01); *H04N 2201/0094* (2013.01)

(56) References Cited

U.S. PATENT DOCUMENTS

| | | | |
|---|---|---|---|
| 6,683,984 B1 * | 1/2004 | Simske | H04N 1/38 |
| | | | 382/190 |
| 7,050,650 B2 | 5/2006 | Maurer et al. | |
| 8,493,634 B2 | 7/2013 | Guo | |
| 9,165,388 B2 * | 10/2015 | Delia | G06T 11/60 |
| 9,241,084 B2 * | 1/2016 | Isaev | H04N 1/047 |
| 2002/0033973 A1 * | 3/2002 | Dolan | H04N 1/00737 |
| | | | 358/449 |
| 2004/0076341 A1 | 4/2004 | Dolan | |
| 2006/0007505 A1 * | 1/2006 | Chelvayohan | H04N 1/38 |
| | | | 358/464 |
| 2006/0165292 A1 | 7/2006 | Li | |
| 2008/0018941 A1 | 1/2008 | Taylor | |
| 2010/0158376 A1 | 6/2010 | Klosterman et al. | |
| 2010/0239165 A1 * | 9/2010 | Wu | G06K 9/2054 |
| | | | 382/176 |
| 2011/0211755 A1 | 9/2011 | Xu | |
| 2013/0135689 A1 * | 5/2013 | Shacham | H04N 1/38 |
| | | | 358/464 |
| 2015/0324639 A1 | 11/2015 | Macciola | |

* cited by examiner

EXTRACTING A DOCUMENT PAGE IMAGE FROM A ELECTRONICALLY SCANNED IMAGE HAVING A NON-UNIFORM BACKGROUND CONTENT

BACKGROUND

A document scanning system may include an image capturing apparatus for producing a digital representation of the spatial variations in reflectance for a document page, or sheet, of reflective media, which is scanned by the system. The capturing apparatus may be, for example, a contact image sensor (CIS) system, which may include a light source of various color light emitting diodes (LEDs), a dispersing light guide and a rod lens array. Moreover, the CIS system may include charge coupled device (CCD) semiconductor packages, or chips, which may be arranged end-to-end to form an array of light sensitive elements. The CIS system may also include hardware to convert the signals provided by the light sensitive signals into data that represents digital pixel values.

DETAILED DESCRIPTION

One way to design a document scanning system is to include features to deliver data representing an image of a scanned document page, such that all pixels of the image, which do not represent the document page, represent a known background response. For example, one solution may be to construct the document scanning system to deliver data representing a scanned image in which content outside of the portion of the image pertaining to the scanned document page is uniform (a uniform white background, for example).

However, other document scanning systems may not deliver data representing a scanned image having such a uniform background content. For example, the document scanning system may be a compact system, such as a system that uses a scroll-fed device, and which images the document page directly against a feed roller that supports the document page during scanning. As a result, data delivered by such a document scanning system may represent an image of the document page superimposed on a non-uniform background. A non-uniform background may present challenges for subsequent scan and copy processing of the data as it may be challenging to precisely extract an image of the scanned document page.

In accordance with example implementations that are described herein, a document scanning system that scans against a non-uniform background is constructed to process the acquired scanning data to extract the image of the scanned document page (called the "document page image," "document image," "page image," and so forth herein). More specifically, as described herein, in accordance with example implementations, the document scanning system acquires data that represents a composite image of a scanned document page and non-uniform background content. The scanning system processes the data to characterize the background content and apply a page boundary model to the document page for purposes of determining the boundary of the document page in the composite image. The scanning system may then extract the image of the document page from the composite image based at least in part on the determined boundary.

Figure 1:
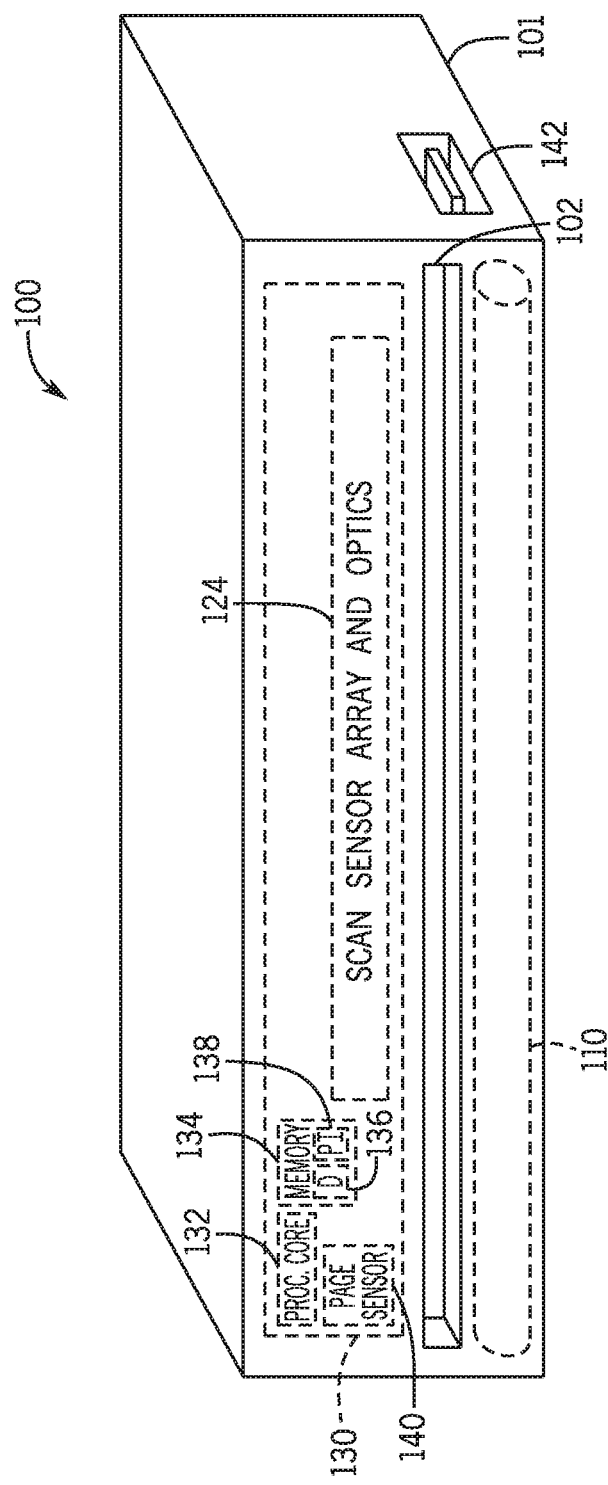
FIG. 1 is a schematic diagram of an electronic scanning system to scan a document page according to an example implementation.

Referring to FIG. 1, as a more specific example, a scanning system 100 may include a scan sensor array and optics 124, which sense the reflected illumination from a document page. For the example implementation depicted in FIG. 1, the scanning system 100 has a housing 101 in which the scan sensor array and optics 124 as well as other components of the system 100 are disposed; and the housing 101 contains an input slot 102 into with the document page to be scanned is fed. It is noted that the scanning system 100 may take on other forms and use another type of input feeder, in accordance with further implementations.

The scan sensor array and optics 124 may include a linear sensor, such as a sensor that is formed from CCD semiconductor packages that are arranged end-to-end, for example. In accordance with example implementations, the scanning system 100 may be a scroll-fed device in which the document page is fed into the input slot 102 and advanced by one or multiple rollers 110 that contact the document page.

Figure 2:
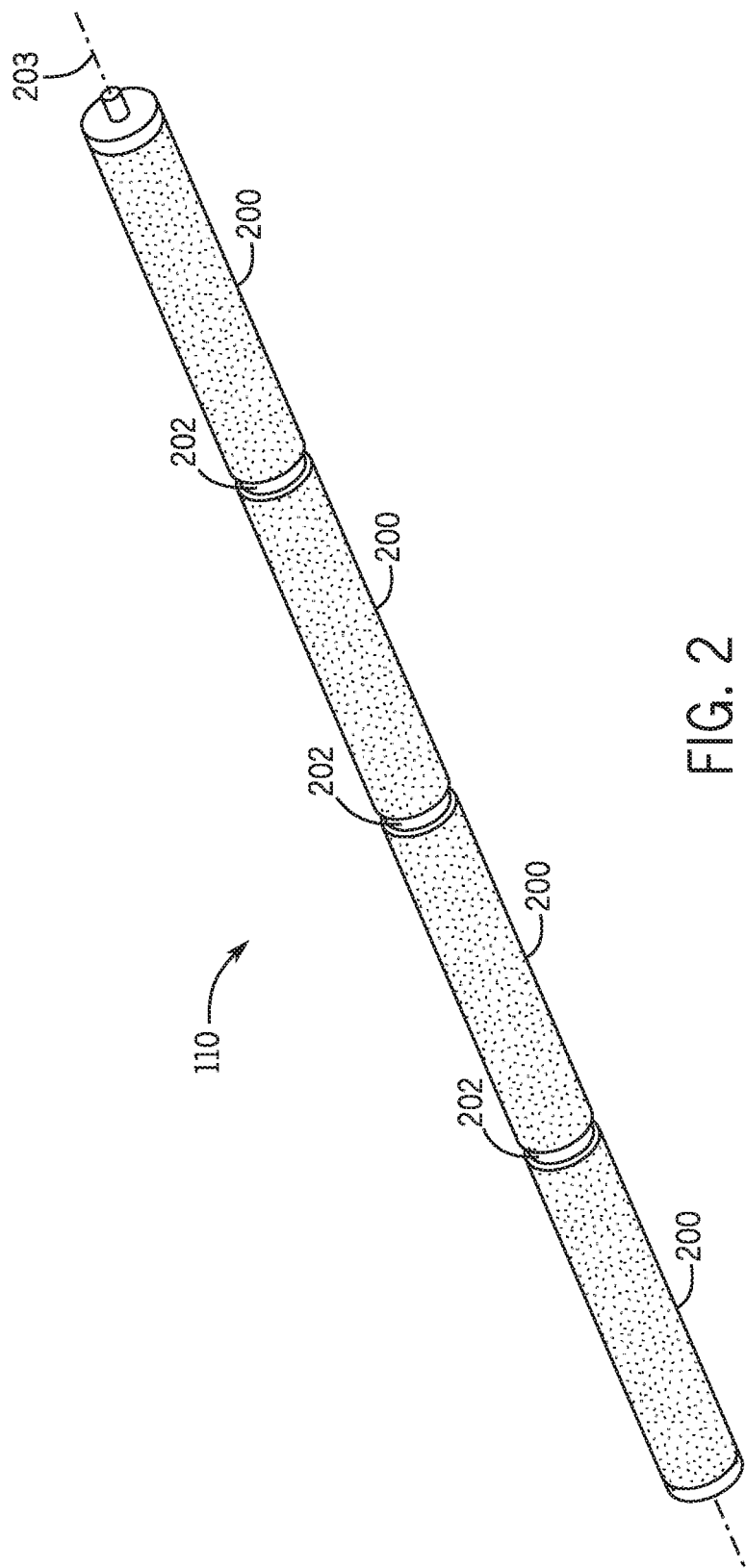
FIG. 2 is a perspective view of a roller of the scanning system of FIG. 1 according to an example implementation.

In accordance with example implementations, the scan sensor array and optics 124 image the document page directly against a roller 110. In this manner, referring to FIG. 2 in conjunction with FIG. 1, in accordance with example implementations, the roller 110 against which the document page is imaged may be a segmented roller, which is constructed to rotate about a longitudinal axis 203 to advance a document page being scanned, and the roller 110 includes tires 200 that grip and advance the document page through the scanning system 100. As illustrated in FIG. 2, the roller 110 may include gaps 202 between adjacent tires 200. The tires 200 may be, as an example, dark colored (black, for example) rubber tires (i.e., the tires 200 may present generally non-reflective imaging surfaces), and the gaps 202 may expose a reflective surface (a white surface, for example). This gives rise to a non-uniform background for the scanned composite image that is acquired by scanning system 100.

It is noted that the roller 110 of FIG. 2 is an example of a surface against which a document page may be scanned to impart a non-uniform background content to the resulting scanned composite image. Although this example non-uniform background content has larger darker regions separated by relatively smaller lighter regions, the opposite may be true, in accordance with example implementations. Moreover, the non-uniform background content may not be a repeating pattern, in accordance with further implementations. In general, a "non-uniform background content" or "non-uniform background" means that the background content/background is heterogeneous, i.e., is not associated with the same pixel color or pixel intensity.

Referring back to FIG. 1, the document scanning system 100 may include a page sensor 140 for purposes of sensing the trailing edge (or other edge) of the scanned document page. Using the output of the page sensor 140, the scanning system 100 may detect when pure background content is being scanned (i.e., the scanning system 100 may detect when clearly the segmented roller 110 and not the document page is being scanned). The document scanning system 100 may include a communication port 142 (a Universal Serial Bus (USB) or Ethernet port, as examples) for purposes of communicating data represented the extracted image to a computing device (a desktop computer, tablet computer, laptop computer, and so forth).

As described herein, the scanning system 100 may include one or multiple processing cores 132 (one or multiple central processing unit (CPU) cores, as an example) and a memory 134. As an example the memory 134 may be a non-transitory storage medium that is formed from semiconductor memory devices, phase change memory devices, magnetic storage devices, memristors, a combination of two or more of these or other storage devices, and so forth. The memory 134 may store program instructions 138 (i.e., machine executable instructions, or "software") and data 136. As an example, the data 136 may be image data; or preliminary, intermediate and/or final result data associated with any of the image processing techniques that are described herein.

In accordance with example implementations, the program instructions 138, when executed by the processing core(s) 132, cause the processing core(s) 132 to apply imaging processing techniques that are described herein for purposes of processing acquired data representing the scanned composite image to extract an image of a document page from the composite image.

Figure 3:
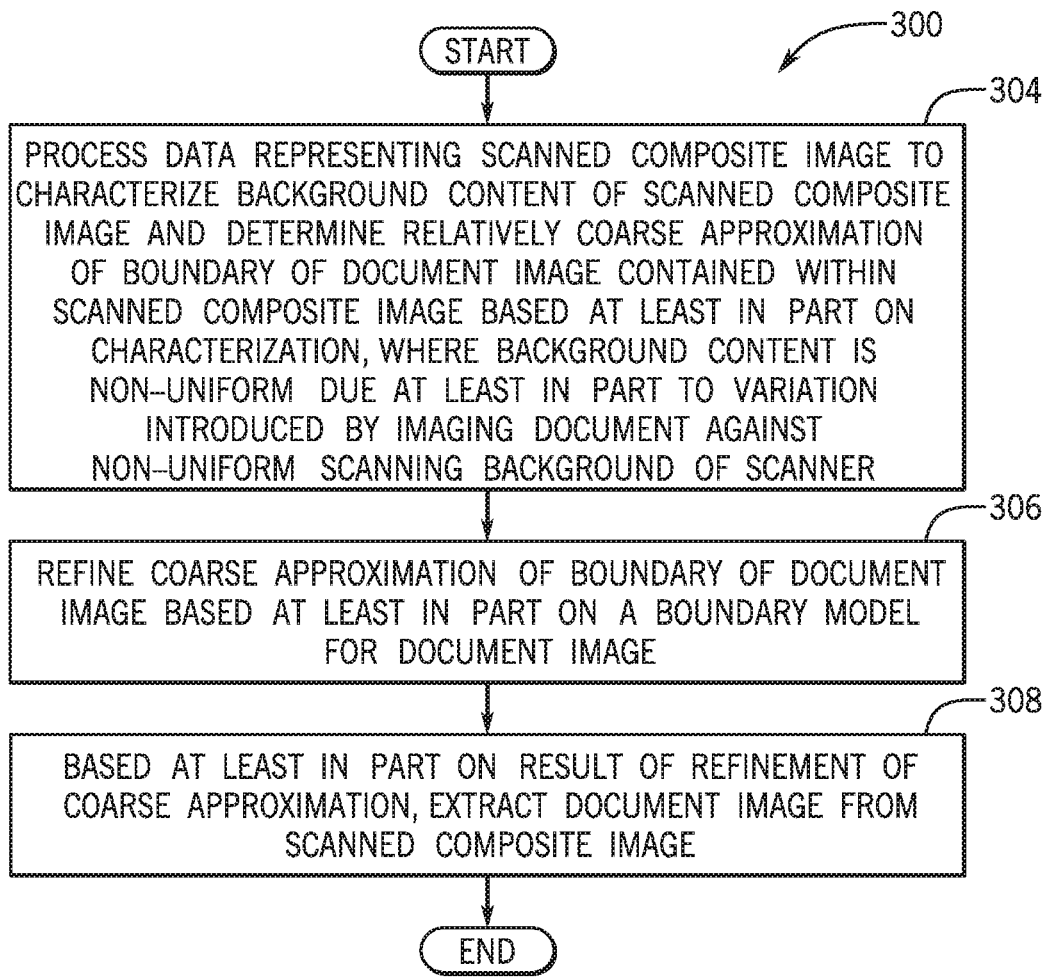
FIGS. 3, 4 and 6 are flow diagrams depicting techniques to extract an image of a document page scanned by the scanning system according to example implementations.

More specifically, in accordance with example implementations, one or multiple processing cores 132 (FIG. 1) may execute program instructions 138 (FIG. 1) for purposes of performing a technique 300 that is illustrated in FIG. 3. Referring to FIG. 3, pursuant to block 304 of the technique 300, data representing a scanned composite image is processed to characterize a background content of the scanned composite image and determine a relatively coarse approximation of a boundary of a document image that is contained within the scanned composite image based at least in part on the characterization. The background content is non-uniform due at least in part to a variation that is introduced by imaging against a non-uniform scanning background of a scanner. Pursuant to the technique 300, the coarse approximation of the boundary of the document image is refined (block 306) based at least in part on a boundary model for the document image; and based at least in part on the result of the refinement, the document image is extracted (block 308) from the scanned composite image.

Figure 4:
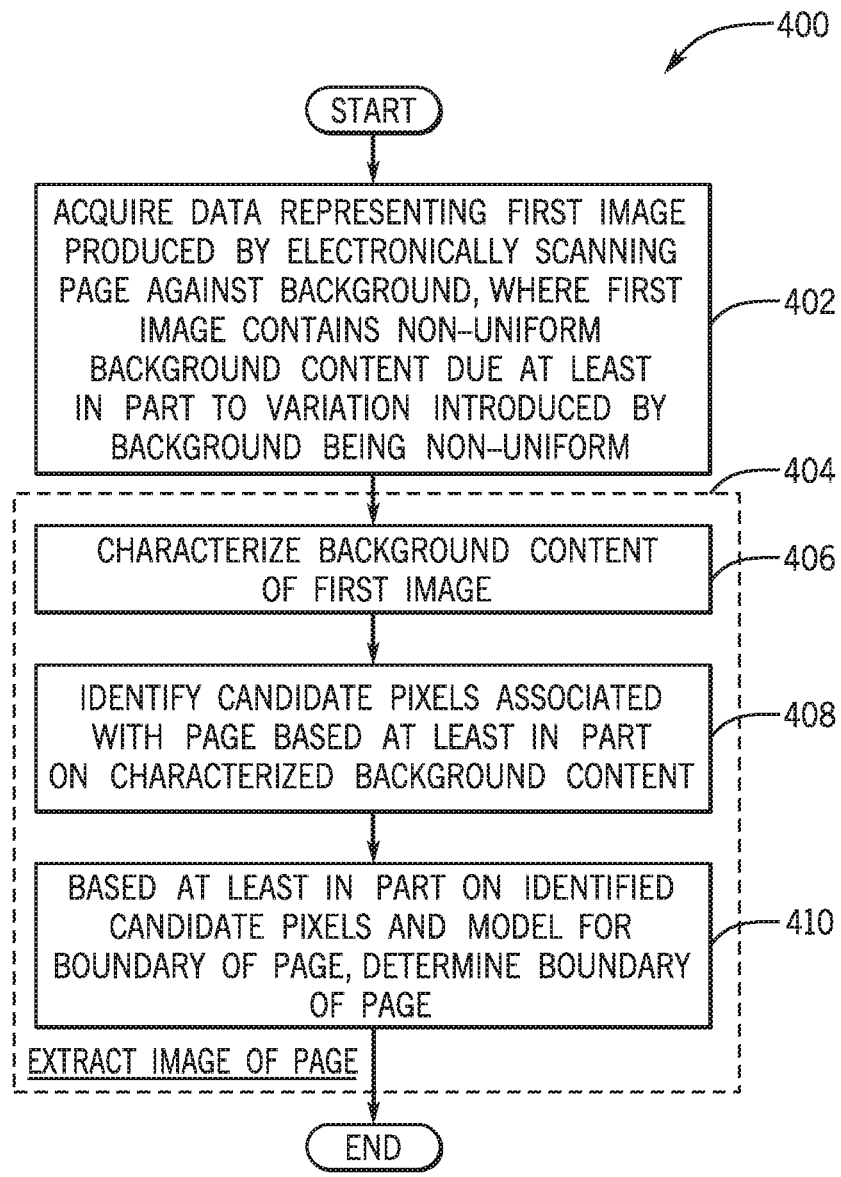

More specifically, in accordance with some implementations, one or multiple processing cores 132 (FIG. 1) may execute program instructions 138 (FIG. 1) for purposes of performing a technique 400 that is depicted in FIG. 4. Referring to FIG. 4, pursuant to the technique 400, data is acquired (block 402), which represents a first image that is produced by electronically scanning a page against a background. The first image contains non-uniform background content due at least in part to a variation that is introduced by the background (against which the page is scanned) being non-uniform. The technique 400 includes extracting (block 404) an image of the page from the first image. The extraction 404 includes characterizing (block 406) the background content and identifying (block 408) candidate pixels that are associated with the page based at least in part on the characterized background content. The technique 400 includes determining (block 410) a boundary of the page based at least in part on the identified candidate pixels and a model for the boundary of the page.

Given a document page described by a continuous two-dimensional spectral reflectance $f_\lambda(x, y; \lambda)$, an ideal scan system may be described in terms of brightness response functions. For example, a red green blue (RGB) scanning system may be described by three brightness response functions (one corresponding to each of the system's red, green and blue response channels), as described below:

$$f_r(x,y)=\int f_\lambda(x,y;\lambda)r(\lambda)d\lambda,\qquad\text{Eq. 1}$$

$$f_g(x,y)=\int f_\lambda(x,y;\lambda)g(\lambda)d\lambda,\text{ and}\qquad\text{Eq. 2}$$

$$f_b(x,y)=\int f_\lambda(x,y;\lambda)b(\lambda)d\lambda,\qquad\text{Eq. 3}$$

where "$r(\lambda)$," "$g(\lambda)$," and "$b(\lambda)$" represent the spectral responsivities of the respective color channels. These three response functions may be combined to form an RGB color image function, as described below:

$$f(x,y)=[f_r(x,y),f_g(x,y),f_b(x,y)]^\tau.\qquad\text{Eq. 4}$$

Due to the discrete nature of the scanning system, the image function f(x,y) may be sampled spatially at regularly spaced locations that are determined by the spatial resolution of the scanned image. If "X" and "Y" denote, respectively, the horizontal and vertical spacing between samples, then the positions at which image samples are obtained are given by (mX,nY), where "m" and "n" represent integers. Thus, the scanned image f[m, n] (also referred to as the "scanned composite image" herein) may be related to the continuous image function, as described below:

$$f[m,n]=f(mX,nY).\qquad\text{Eq. 5}$$

In accordance with example implementations, the one or multiple processing cores 132 (FIG. 1) of the document scanning system 100 may execute program instructions 138 to cause the document scanning system to process the acquired data representing the scanned composite image by converting the scanned composite image into a lower resolution image (called a "thumbnail image" herein); performing a background over scan; identifying directional image features; identifying candidate pixels associated with the document page image; modeling a boundary of the document page image; and using the model to extract the document page image. These processing steps are described below.

Converting Scanned Composite Image Into Thumbnail Image

In accordance with example implementations, as an initial step, the document scanning system 100 may construct a lower resolution image (called a "thumbnail image" herein) from the full resolution, scanned composite image. This may be particularly advantageous for the scanning system 100 to allow the scanning system 100 to have limited and lower cost processing core(s) and memory, thereby greatly reducing the computational resources that are used.

To obtain a lower resolution thumbnail image of the scanned image, some averaging or integration over neighboring regions may be calculated. This may be modeled as a convolution, as described below:

$$g[i,j] = \Sigma_n \Sigma_m f[iM+m, jN+n] h[m,n], \quad \text{Eq. 6}$$

where "M" and "N" represent, respectively, the horizontal and vertical subsampling rates; and "h[m,n]" represents the impulse response of the subsampling filter. For example, h[m,n] may represent a simple local average, such as the one described below:

$$h[m,n] = \begin{cases} \frac{1}{NM}, & |n| \leq \frac{N}{2} \text{ and } |m| \leq \frac{N}{2}. \\ 0, & \text{otherwise} \end{cases} \quad \text{Eq. 7}$$

In accordance with example implementations, Joint Photographic Experts Group (JPEG) standard-based compression is used to down sample the full resolution, scanned composite image to produce the thumbnail image.

Background Overscan

For the purpose of analyzing the low-resolution thumbnail, the document scanning system 100 may obtain and analyze an overscan capturing the unoccluded scan of the background field of view. For example, each pixel column of a trailing overscan may be averaged to establish a characteristic pixel value for each column of the background. Each pixel of the thumbnail may then be compared to its corresponding background characteristic to assist subsequent processing.

Identifying Directional Image Features

For the purpose of analyzing the low-resolution thumbnail, the document scanning system 100 may use directionally selective feature detectors. For example, a vertical image gradient (vertical derivative) may be used to locate horizontal image features such as the top and bottom of the target page, while allowing vertical features like roller marks and dust streaks (as examples) to be discounted.

Identifying Candidate Pixels Associated With Document Page Image

In analyzing the thumbnail image and any corresponding image features and background characteristics, the document scanning system 100 may determine, for each pixel, the likelihood that the pixel belongs either to the target page or to the background. For example, in accordance with further example implementations, any pixel differing from the corresponding background characteristic by more than a prescribed amount may be considered to be candidate page pixel. As a further example, any pixel having a selected directional feature may be included as a candidate page pixel. To label page pixels from non-page pixels, the document scanning system 100 may "binarize" image thumbnail such that, for example, page pixels are assigned a value of one and non-page pixels are assigned a value of zero. The document scanning system 100 may reduce the number of pixel intensity values using other techniques, in accordance with further example implementations.

Separating page and background pixels may be a relatively noisy process, which may result in spurious labeling of page pixels. Such false positives may complicate subsequent analysis, and it may be advantageous to remove isolated page pixels from such consideration. This can be accomplished by various noise suppression approaches. For example, in accordance with example implementations, the document scanning system 100 may apply a filter, such as a 5×5 morphological opening filter, to the binarized thumbnail image in order to re-label isolated page pixels as background.

Mathematical morphology is a theory and technique for the analysis and processing of geometrical structures and may be applied to binary images. Morphological operations apply a structuring element to an input image, creating an output image of the same size. In a morphological operation, the value of each pixel in the output image is based on a comparison of the corresponding pixel in the input image with its neighbors. By choosing the size and shape of the neighborhood, a morphological operation may be constructed that is sensitive to specific shapes in the input image.

In the morphological operations, the state of any given pixel in the output image may be further determined by applying a rule to the corresponding pixel and its neighbors in the input image, in accordance with example implementations. The rule used to process the pixels defines the operation. The morphological operations that are applied by the document scanning system 100 may include erosion and dilation functions. In accordance with further example implementations, erosion functions may be used to remove pixels on object boundaries. The number of pixels removed from the objects in an image depends on the size and shape of the structuring element used to process the image. For erosion, the value of the output pixel is the minimum value of all the pixels in the input pixel's neighborhood. In a binary image, if any of the pixel values is 0, the output pixel is set to 0. Dilation functions add pixels to the boundaries of objects in an image. The number of pixels added to the objects in an image depends on the size and shape of the structuring element used to process the image. In accordance with further example implementations, for dilation, the value of the output pixel is the maximum value of all the pixels in the input pixel's neighborhood. In a binary image, if any of the pixels is set to the value 1, the output pixel is set to 1.

A morphological opening function is the dilation of the erosion of an image by a common structuring element. The morphological opening function removes small objects from the foreground (page pixels) of an image, placing them in the background.

Thus, in accordance with some implementations, the page membership of the pixels is represented using a binary membership function. In accordance with further example implementations, a membership function may be used that indicates a degree of membership. For example, the membership function may be a fuzzy logic-based membership function that indicates a degree of membership rather than a mere Boolean value. That is, a pixel may be assigned a number that is proportional to a degree of page membership (for example, a pixel may be identified as 10% page and 90% background). Such fuzzy memberships may then be useful in directing subsequent processing. Therefore, in accordance with example implementations, identifying candidate pixels may include assigning degrees of page membership to pixels based at least in part on levels of dissimilarities of the pixels to the characterized background content to generate an image representing the page; and filtering the image representing the page to generate an image representing the candidate pixels. The identifying and filtering may occur by processing the full resolution image or by processing the thumbnail image, depending on the particular implementation. In accordance with example implementations, down sampling to produce the thumbnail image occurs first, and then, each processing stage, including background characterization, occurs at the lower resolution, with the final results being scaled back to the original resolution, as further described herein.

Modeling Boundary of Document Page Image

With respect to a selected page boundary model, it may be advantageous to limit consideration of labeled candidate page pixels to those points that include the outer perimeter of the target page. Limiting the number of page pixels to be processed may have the benefit of reducing the number of calculations, as compared to considering all points belonging to the page. In accordance with some implementations, to isolate the page boundary from other page pixels, the document scanning system 100 extracts first and last page pixel in each column and row of the binarized and noise-filtered image to form a set of point coordinates, which describe the positioning of an approximate, or (coarse) outline of the target page.

Thus, in accordance with example implementations, the page boundary extraction process performed by the document scanning system 100 produces a set of point coordinates representing a rough outline of the target page, which may be subject to significant noise. In accordance with example implementations, to improve signal-to-noise robustness, an a priori page boundary model may be selected to which to fit the boundary data for describing the page. As an example, in accordance with some implementations, the page boundary model, may be a convex quadrilateral that best matches coordinate locations of the boundary pixels. Other geometric shapes may be used for a page boundary model, in accordance with further example implementations. Assuming a quadrilateral, for purposes of determining a best-fit quadrilateral, the problem may be solved using clustering, where the cluster centers are the four straight lines forming the edges of the quadrilateral. Then, to compute the clustering, the document scanning system 100 may apply a k-means algorithm.

In accordance with example implementations, the document scanning system 100 begins the k-means algorithm with the selection of the minimum axis-aligned bounding box enclosing the boundary points. The document scanning system 100 may use this bounding box as an initial estimate of the bounding quadrilateral. Subsequently, the document scanning system 100 may partition the set of boundary points into four groupings according to which of the four edges of the bounding quadrilateral each point is closest. Next, the document scanning system 100 may fit a line to each grouping of points.

The document scanning system 100 fitting iteratively, in accordance with example implementations. More specifically, the set of points may be repeatedly partitioned according the line each lies closest to, and then, a new line may be fitted to each of the point groupings. This process may continue until the repartitioning results in no points being reassigned to a different group. In accordance with some implementations, the number of iterations allowed may be limited to a predefined value. Additionally, in partitioning the boundary points, those boundary points greater than a preselected distance from all of the quadrilateral edges may be ignored in any particular iteration, in accordance with some implementations.

In accordance with an example implementation, the document scanning system 100 may use a weighted, total least-squares optimization to determine the boundary of the page. A line in a plane may be described as follows:

$$a_x x + a_y y = c, \qquad \text{Eq. 8}$$

where "a", "b" and "c" represent real constants with a and b not being both zero. The distance from the line to a point $(x_0, y_0)$ may be described as follows:

$$d(a_x x + a_y y = c, (x_0, y_0)) = \frac{|a_x x_0 + a_y y_0 - c|}{\sqrt{a_x^2 + a_y^2}}. \qquad \text{Eq. 9}$$

Eq. 9 may be rewritten in vector notation. For this purpose, the parameters of Eq. 9 may be rewritten in vector notation as follows:

$$a = \begin{bmatrix} a_x \\ a_y \end{bmatrix}, \qquad \text{Eq. 10}$$

$$x = \begin{bmatrix} x \\ y \end{bmatrix}, \qquad \text{Eq. 11}$$

$$x_0 = \begin{bmatrix} x_0 \\ y_0 \end{bmatrix}, \text{ and} \qquad \text{Eq. 12}$$

$$a^\tau x = c. \qquad \text{Eq. 13}$$

The distance from this line to the point $x_0$ may be described as follows:

$$|d(a^\tau x = c, x_0)| = \frac{|a^\tau x_0 - c|}{\sqrt{a^\tau a}}. \qquad \text{Eq. 14}$$

The vector a may be constrained as follows:

$$\|a\| = \sqrt{a^\tau a} = 1. \qquad \text{Eq. 15}$$

With this constraint, the distance formula (Eq. 14) may be rewritten as follows:

$$|d(a^\tau x = c, x_0)| = |a^\tau x_0 - c|. \qquad \text{Eq. 16}$$

Thus, for calculating the total least-squares regression of a set of points to a best-fit line for the given set of points $\{x_n | n \in N\}$, a and c may be determined as follows. The expression, $$E = \Sigma_{n \in N} w_n (a^\tau x_n - c)^2, \qquad \text{Eq. 17}$$

may be minimized, subject to the following constraint:

$$\|a\| = 1. \qquad \text{Eq. 18}$$

In other words, a and c may be determined as follows:

$$(a,c) = \text{argmin}_{(a,c)} (\Sigma_{n \in N} w_n (a^\tau x_n - c)^2 + \lambda(a^\tau a - 1)), \quad \text{Eq. 19}$$

where "$w_n$" represent some weighting providing the relative importance of each point to the optimization. Expanding Eq. 19 results in the following:

$$(a,c) = \text{argmin}_{(a,c)} (c^2 (\Sigma_{n \in N} w_n) - 2ca^\tau (\Sigma_{n \in N} w_n x_n) + a^\tau (\Sigma_{n \in N} w_n x_n x_n^\tau) a + \lambda(a^\tau a - 1)). \quad \text{Eq. 20}$$

Eq. 20 may be written in a more compact form as follows:

$$(a,c) = \text{argmin}_{(a,c)} (c^2 W - 2cWa^\tau \bar{x} + a^\tau X a + \lambda(a^\tau a - 1)), \quad \text{Eq. 21}$$

where the following applies:

$$\frac{\partial}{\partial a}(c^2 W - 2cWa^\tau \bar{x} + a^\tau X a + \lambda(a^\tau a - 1)) = \quad \text{Eq. 22}$$
$$0 = -2cW\bar{x} + 2Xa + 2\lambda a,$$

$$\bar{x} = \frac{1}{W} \sum_{n \in N} w_n x_n, \text{ and} \quad \text{Eq. 23}$$

$$X = \sum_{n \in N} w_n x_n x_n^\tau. \quad \text{Eq. 24}$$

Eq. 21 may then be rewritten as follows:

$$(a,c) = \text{argmin}_{(a,c)} (c^2 W - 2cWa^\tau \bar{x} + a^\tau X a + \lambda(a^\tau a - 1)), \quad \text{Eq. 25}$$

To determine the parameters the parameters a and c, the following derivatives may be calculated:

$$\frac{\partial}{\partial a}(c^2 W - 2cWa^\tau \bar{x} + a^\tau X a + \lambda(a^\tau a - 1)) = \quad \text{Eq. 26}$$
$$0 = -2cW\bar{x} + 2Xa + 2\lambda a, \text{ and}$$

$$\frac{\partial}{\partial c}(c^2 W - 2cWa^\tau \bar{x} + a^\tau X a + \lambda(a^\tau a - 1)) = 0 = 2cW - 2Wa^\tau \bar{x}. \quad \text{Eq. 27}$$

Eq. 27 may be solved for c as follows:

$$c = a^\tau \bar{x}. \quad \text{Eq. 28}$$

Substituting c (Eq. 28) into Eq. 22 results in the following:

$$(X - W\bar{x}\bar{x}^\tau)a + \lambda a = 0. \quad \text{Eq. 29}$$

Eq. 29 is an eigenvalue problem, with the eigenvector corresponding to the minimum eigenvalue of the 2×2 weighted covariance matrix being the desired coefficient vector a:

$$\Sigma = \begin{bmatrix} \sigma_{xx} & \sigma_{xy} \\ \sigma_{xy} & \sigma_{yy} \end{bmatrix} = X - W\bar{x}\bar{x}^\tau = \sum_{n \in N} w_n (x_n - \bar{x})(x_n - \bar{x})^\tau. \quad \text{Eq. 30}$$

The eigenvalues of $\Sigma$ may be determined by solving the following equation:

$$|\Sigma + \lambda I| = 0. \quad \text{Eq. 31}$$

In other words, the eigenvalues may be determined as follows:

$$\left\| \begin{bmatrix} \sigma_{xx} + \lambda & \sigma_{xy} \\ \sigma_{xy} & \sigma_{yy} + \lambda \end{bmatrix} \right\| = 0 \quad \text{Eq. 32}$$

$$(\sigma_{xx} + \lambda)(\sigma_{yy} + \lambda) - \sigma_{xy}^2 = 0, \quad \text{Eq. 33}$$

$$\sigma_{xx}\sigma_{yy} + \sigma_{xx}\lambda + \sigma_{yy}\lambda + \lambda^2 - \sigma_{xy}^2 = 0, \text{ and} \quad \text{Eq. 34}$$

$$\lambda^2 + (\sigma_{xx} + \sigma_{yy})\lambda + \sigma_{xx}\sigma_{yy} - \sigma_{xy}^2 = 0, \quad \text{Eq. 35}$$

Because $\Sigma$ is positive semi-definite, the minimum eigenvalue may be determined as follows:

$$\lambda^{(-)} = -\frac{\sigma_{xx} + \sigma_{yy}}{2} + \sqrt{\left(\frac{\sigma_{xx} - \sigma_{yy}}{2}\right)^2 + \sigma_{xy}^2}. \quad \text{Eq. 36}$$

The corresponding eigenvector may be described as follows:

$$\Sigma a^{(-)} + \lambda^{(-)} a^{(-)} = 0. \quad \text{Eq. 37}$$

In other words, the eigenvalues may be determined as follows:

$$\begin{bmatrix} \sigma_{xx} + \lambda^{(-)} & \sigma_{xy} \\ \sigma_{xy} & \sigma_{yy} + \lambda^{(-)} \end{bmatrix} \begin{bmatrix} a_x^{(-)} \\ a_y^{(-)} \end{bmatrix} = 0, \text{ and} \quad \text{Eq. 38}$$

$$\begin{bmatrix} \frac{\sigma_{xx} - \sigma_{yy}}{2} + \sqrt{\left(\frac{\sigma_{xx} - \sigma_{yy}}{2}\right)^2 + \sigma_{xy}} & \sigma_{xy} \\ \sigma_{xy} & -\frac{\sigma_{xx} - \sigma_{yy}}{2} + \sqrt{\left(\frac{\sigma_{xx} - \sigma_{yy}}{2}\right)^2 + \sigma_{xy}} \end{bmatrix} \begin{bmatrix} a_x^{(-)} \\ a_y^{(-)} \end{bmatrix} = 0. \quad \text{Eq. 39}$$

For purposes of simplification, the following expression may be defined:

$$\Delta_{xy} = \frac{\sigma_{xx} - \sigma_{yy}}{2}. \quad \text{Eq. 40}$$

Substituting $\Delta_{xy}$ (Eq. 40) into Eq. 39 results in the following:

$$\begin{bmatrix} \Delta_{xy} + \sqrt{\Delta_{xy}^2 + \sigma_{xy}^2} & \sigma_{xy} \\ \sigma_{xy} & -\Delta_{xy} + \sqrt{\Delta_{xy}^2 + \sigma_{xy}^2} \end{bmatrix} \begin{bmatrix} a_x^{(-)} \\ a_y^{(-)} \end{bmatrix} = 0. \quad \text{Eq. 41}$$

From the top row of Eq. 41, if $a_x^{(-)} = 1$, then $a_y^{(-)}$ may be described as follows:

$$a_y^{(-)} = -\frac{\Delta_{xy}}{\sigma_{xy}} - \sqrt{\left(\frac{\Delta_{xy}}{\sigma_{xy}}\right)^2 + 1}. \quad \text{Eq. 42}$$

In vector form, $a_y^{(-)}$ and $a_x^{(-)}$ may be described as follows:

$$a^{(-)} = k \begin{bmatrix} \sigma_{xy} \\ -\Delta_{xy} - \sqrt{\Delta_{xy}^2 + \sigma_{xy}^2} \end{bmatrix}, \quad \text{Eq. 43}$$

where "k" represents a constant of proportionality determined by imposing the constraint $\|a\| = 1$. As set forth above in Eq. 28, $c = a^\tau \bar{x}$.

In accordance with the iterative approach described above, the document scanning system 100 may determine the set of weights $\{w_n\}$ at each iteration for the purpose of rendering the solution more robust to noise and data outliers. For example, whereas a constant uniform weighting $w_n=1$ for all n produces a standard least squares regression, setting the weights inversely according to the distance of the point from the current line estimate provides a solution that approximates a least absolute deviations regression, as described below:

$$w_n = \frac{1}{\max(\delta, |a^T x_n - c|)}, \qquad \text{Eq. 44}$$

where "$\delta$" represents small values selected to avoid division by zero.

In accordance with example implementations, the document scanning system 100 may make model adjustments as follows. After a selected page model is fit to extracted page boundary points, model parameters may be checked to ensure that each results from a sufficient number of boundary pixels. In cases when an insufficient number of points are available, heuristic corrections may be conducted to stabilize the model. For example, the slope of any edge representing an insufficient number of pixels may be adjusted to be parallel to its opposite edge. Further, if the opposite edge also represents on insufficient number of boundary pixels, then both edges may be set to either vertical or horizontal, depending on the orientation of the other two edges. If all four edges represent insufficient numbers of pixels, then the minimum axis-aligned bounding box may be used.

In accordance with example implementations, for purposes of enforcing a desired behavior, the document scanning system 100 may identify a known interior point (the location of the mean page pixel, for example), and the document scanning system 100 may sort the edges clockwise about this identified point. In accordance with example implementations, after the sorting, even index edges may be assumed to represent one pair of opposite edges, while odd indexed edges may be assumed to represent the other.

As noted above, page models other than the general convex quadrilateral page boundary model described in the example implementation above, may be used in accordance with further example implementations. Such models may include, as examples, models in which the page boundary is constrained to a rectangle, models in which explicit accounting of missing page data due to unwanted cropping from excessive skew (among other considerations) may be used, and so forth.

Using Model to Extract Document Page Image

After page modeling is completed by analyzing the thumbnail, the document scanning system 100 may scale the resulting model and align the scaled model to the full-resolution by scaling appropriately the parameters of the model. After the model is scaled, the document scanning system 100 may check the pixels in the original image one-by-one to determine whether the pixels should be considered page pixels or background pixels. In accordance with example implementations, this determination is calculated for pixels inside the minimum axis-aligned bounding box and is not calculated for pixels outside the box.

In accordance with example implementations, with respect to a convex quadrilateral, the document scanning system 100 may conduct relatively simple tests to identify points inside the modeled page boundary. For example, the document scanning system 100 may calculate the signed distance between a line and a point. In this manner, with respect to a line and a point, the signed distance between the line and point may be described as follows:

$$d(a^T x = c, x_0) = a^T x_0 - c. \qquad \text{Eq. 45}$$

Eq. 45 is positive or negative, depending on the side of the line on which the point lies. In this manner, a positive distance means that the point is on one side of the line, a negative distance means that the point is on the other side of the line and a zero means that the point is on the line. The polarity of the vector a determines which side of the line is positive and which side is negative.

In accordance with example implementations, for purposes of training the page model, the edges of the determined quadrilateral may be defined such that the interior points correspond to a positive signed distance to all four edges. To enforce this behavior, the document scanning system 100 may identify a known interior point (the location of the mean page pixel, for example), and the document scanning system 100 may adjust the polarity of the quadrilateral edges, such that the four edges are positive for this point. Subsequently, document scanning system 100 may identify check points within the bounding box for purposes of determining whether these points are also within the quadrilateral. Similar tests may be used for other page models, in accordance with further example implementations.

In accordance with example implementations, the signed distance may be used to direct the weighting of Eq. 19 asymmetrically, where, for example, pixels that fall outside of the page (as indicated by the page boundary model) are weighted more strongly than pixels that are inside the page.

Figure 5A:
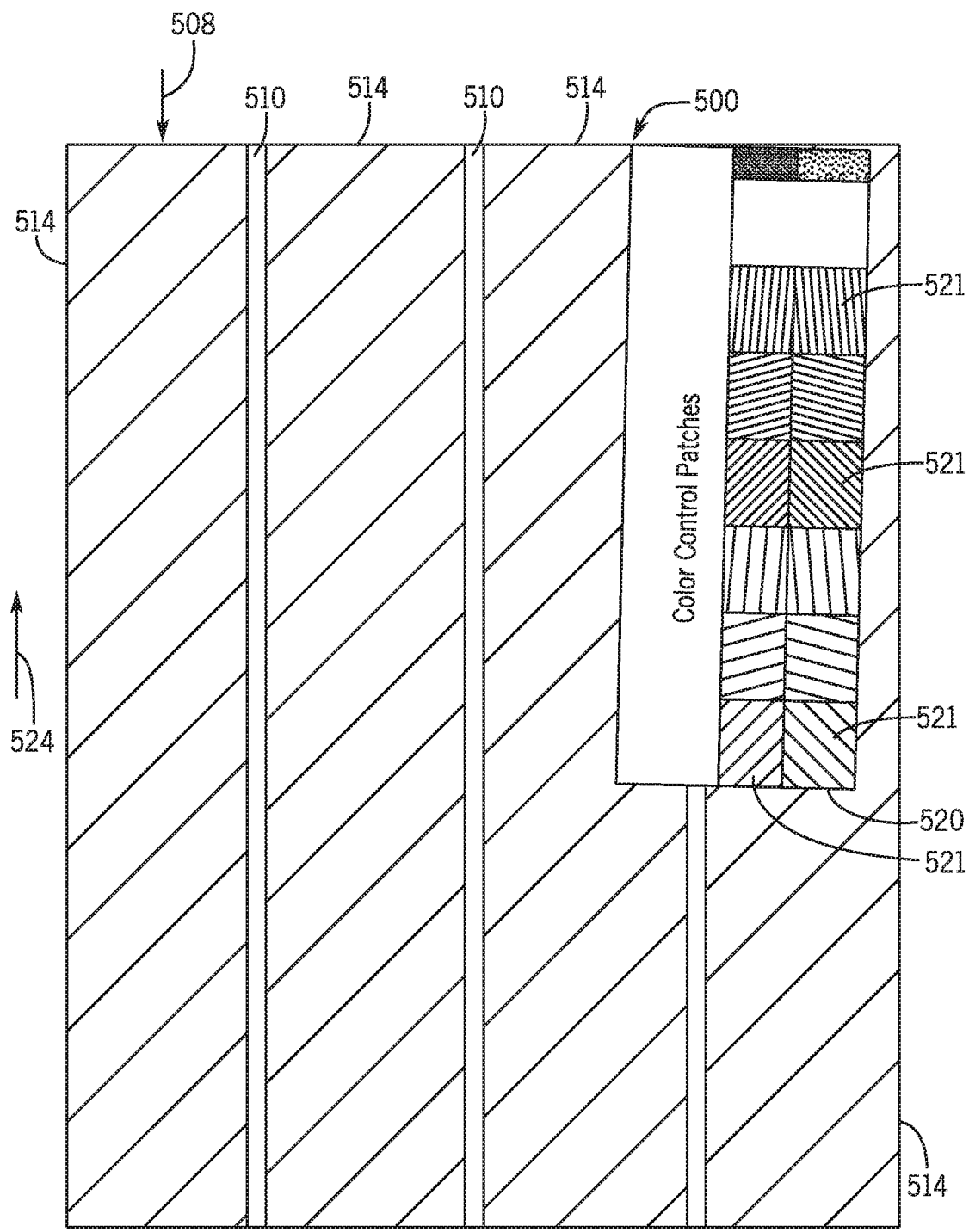
FIG. 5A illustrates a scanned composite image containing an image of a document page and background content according to an example implementation.

FIGS. 5A-5K depict processing the document scanning system 100 for an example implementation in which a scanned composite image 500 (FIG. 5A) is processed for purposes of extracting a document page image 520 from the composite image 500. As depicted in FIG. 5A, the composite image 500 has a non-uniform background content 508 created by the scanning of the document page, against a non-uniform background image (the image 500 is created by the roller 110 of FIG. 2, for example). In this manner, as depicted in FIG. 5A, the background content 508 may include regions 514 of darker content (regions corresponding to tires 210 of the roller 110, for example), which are separated by lighter regions 510 (regions created by the reflective gaps 202 between the tires 210, for example). In general, the document 520 is scanned in a direction 524 illustrated in FIG. 5A. Moreover, as depicted in FIG. 5A, the document image 520 may contain various colors (here, example color patches 521), and the document image 520 may be skewed, as the boundaries of the document image 520 may be skewed with respect to the boundaries of the composite image 500, as shown in FIG. 5A.

Figure 5B:
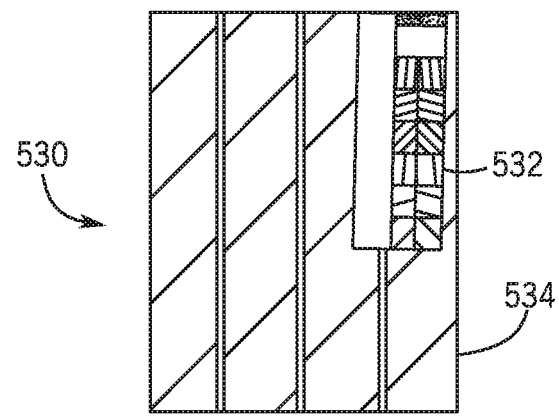
FIG. 5B illustrates a lower resolution thumbnail image derived from the composite image of FIG. 5A according to an example implementation.

In the processing of the data representing the composite image 500, the document scanning system 100 may initially construct a thumbnail image 530 that is depicted in FIG. 5B. The thumbnail image 530, in general, is a lower resolution image of the composite image 500 of FIG. 5A. In this manner, the thumbnail image 530 includes a lower resolution image 532 of the document image 520, as well as lower resolution background content 534 corresponding to the background portion 508 of the composite image 500.

Figure 5C:
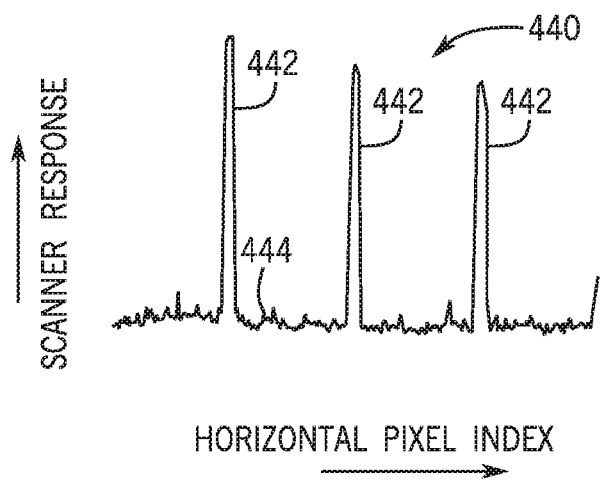
FIG. 5C illustrates a scanner response associated with the background content of the composite image according to an example implementation.
Figure 5D:
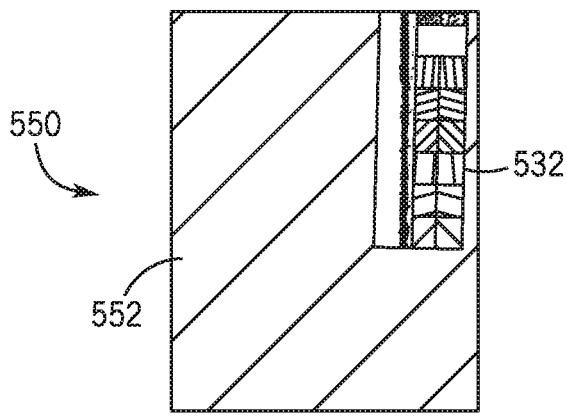
FIG. 5D illustrates the thumbnail image of FIG. 5B after processing to remove characterized background content according to an example implementation.

Referring to FIG. 5C, the document scanning system 100 may next analyze the thumbnail image 530 for purposes of characterizing the background content 534. In this manner, the document scanning system 100 may have one or multiple sensors, such as the page sensor 140 (FIG. 1), for purposes of identifying portions of the composite image 500 (and correspondingly, portions of the thumbnail image 530), which are clearly regions belonging to the background and not to the document image 532. In this identified portion, the scanning system 100 may analyze a scanner response 440 of FIG. 5C. In this regard, the scanner response 440 has peaks 442, corresponding to highly reflective responses, such as responses corresponding to the portions 510 (see FIG. 5A) and a lower magnitude floor 444 corresponding to the darker portions 514 (see FIG. 5A). The document scanning system 100 may then subtract the characterized background content from the thumbnail image 530 (FIG. 5B) in the identified background portion of the image 530 to derive a thumbnail image 550 (see FIG. 5D) having a uniform background content 552. As is noted that, although not depicted in FIG. 5D, the thumbnail image 550 does not represent a clear distinction in the border, or boundary region between the document image 532 and the immediately adjacent background content.

Figure 5E:
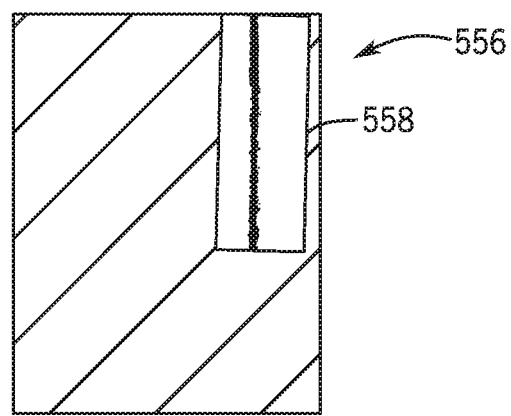
FIG. 5E depicts further processing of the thumbnail image to binarize the pixel intensities of the thumbnail image according to an example implementation.
Figure 5F:
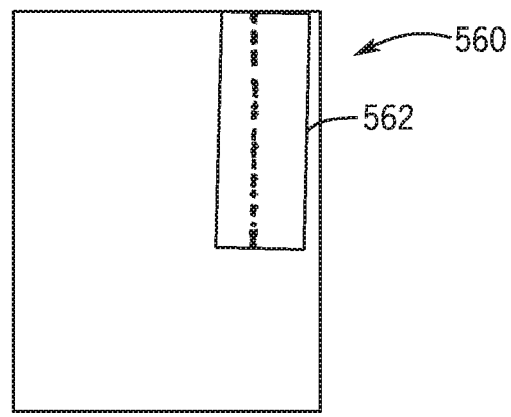
FIG. 5F depicts the binarized thumbnail image after noise cleanup according to an example implementation.

For purposes of extracting the document image 532, the following additional steps may be performed by the document scanning system 100. Referring to FIG. 5E, first, in accordance with example implementations, the document scanning system 100 may binarize the thumbnail image, i.e., transform the image into two distinct pixel intensities (black and white, for example), resulting in a binarized thumbnail image 556 that is depicted in FIG. 5E. The document scanning system 100 may then filter the binarized thumbnail image 556 may then be filtered for purposes of removing noise, resulting in a filtered, binarized thumbnail image 560 that is depicted in FIG. 5F.

Figure 5G:
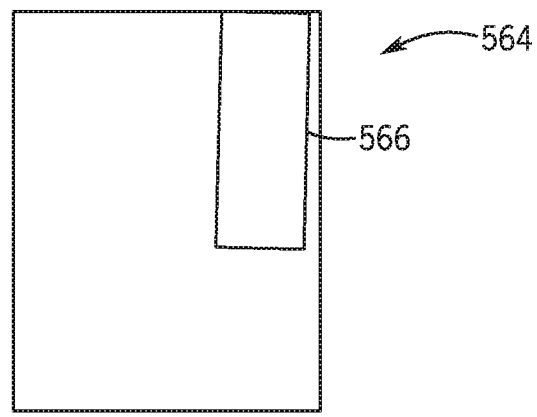
FIG. 5G illustrates identification of boundary pixels associated with a relatively coarse approximation of a boundary of a document page image according to an example implementation.
Figure 5H:
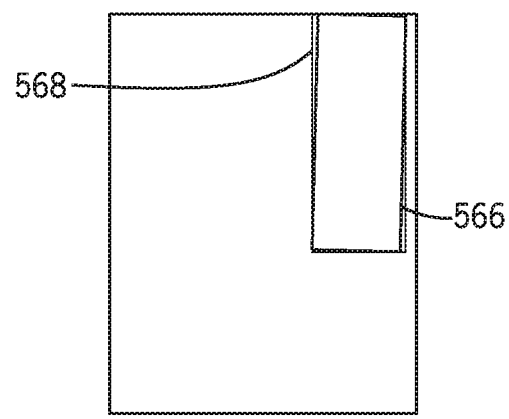
FIG. 5H illustrates initialization of a page boundary model according to an example implementation.

The document scanning system 100 may then identify boundary pixels of the document page image, as depicted by boundary 566 in FIG. 5G. In this manner, the boundary pixels refer to pixels at the border of the background content and the document image of the thumbnail image; and a given pixel in the identified boundary 560 may either belong to the background content or to the document image. In other words, the document scanning system 100 determines a relatively a rough, or coarse, approximation of the boundary of the document page.

Figure 5I:
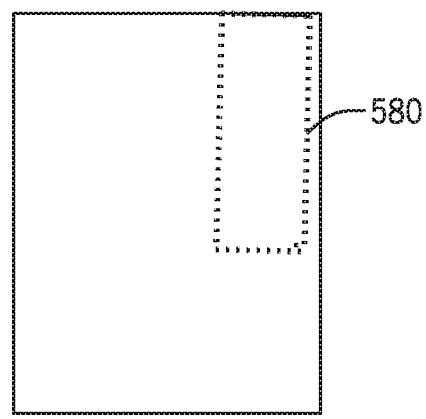
FIGS. 5I and 5J illustrate use of the page boundary model in a least squares fitting technique to refine the approximation of the boundary of the document page image according to an example implementation.
Figure 5J:
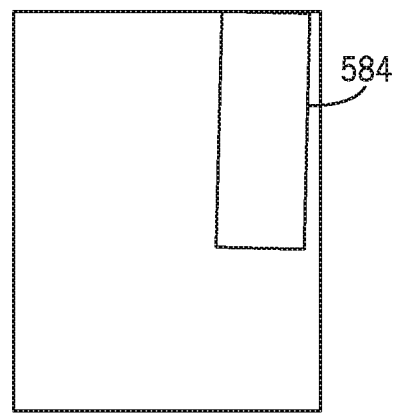
Figure 5K:
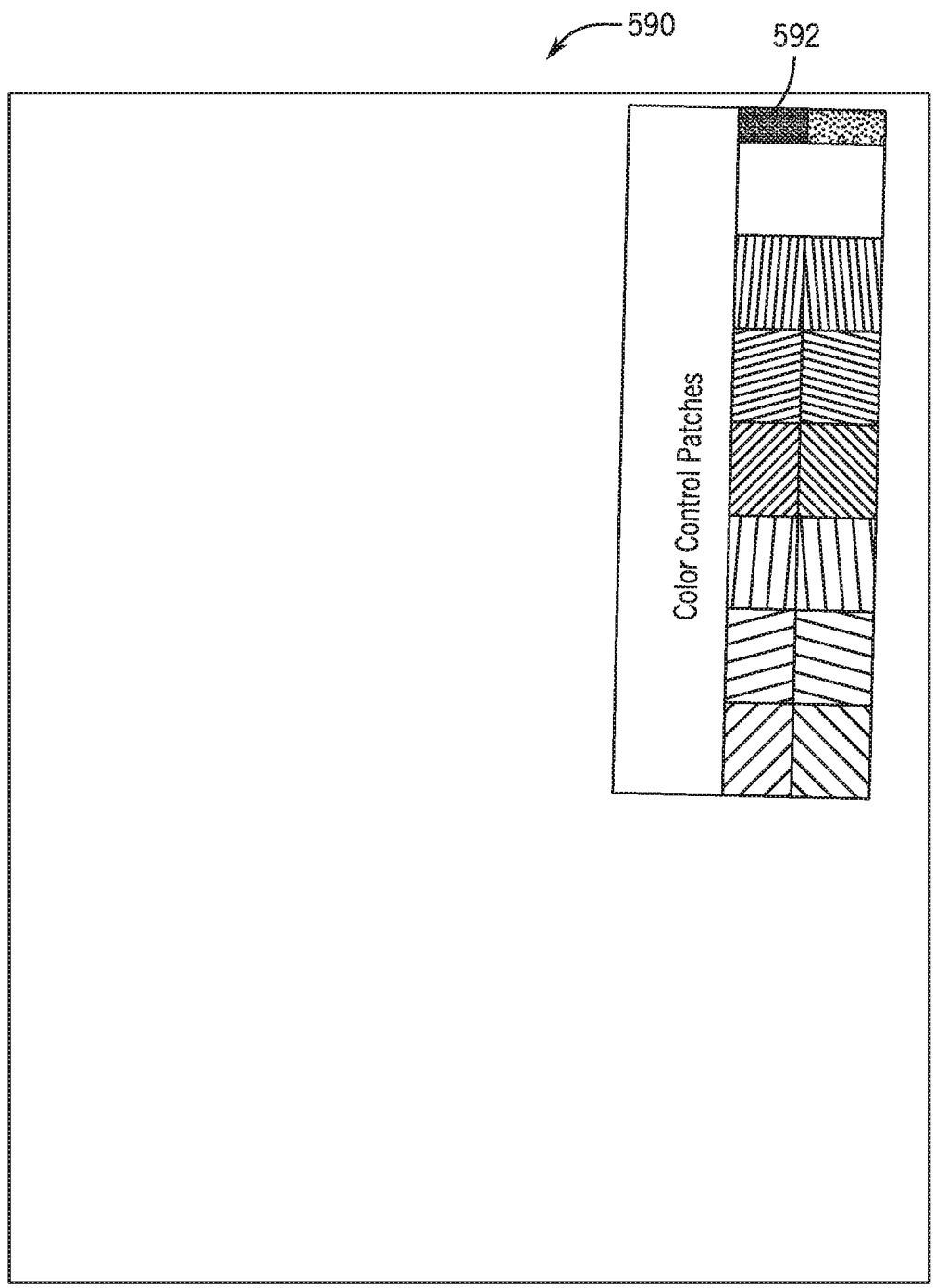
FIG. 5K illustrates an extracted document page image according to an example implementation.

Next, in accordance with example implementations, the document scanning system 100 initializes a page boundary model as a minimum axis-aligned bounding box 568 (see FIG. 5H), which roughly corresponds to the identified boundary pixels 566. Referring to FIG. 5I, in accordance with example implementations, the scanning system 100 performs a fitting algorithm for purposes of adjusting the boundary defined by the page boundary model to fit the identified boundary points 566 (i.e., the document scanning system 100 relines the approximate boundary). As an example, in accordance with some implementations, the document scanning system 100 partitions the identified boundary points (see identified points 580 partitioned to page FIG. 5I) and then performs a least squares fit to the point partitions to derive an adjusted page model-defined boundary 584 that is depicted in FIG. 5J. As discussed above, this fitting may be performed in iterations. The result of the fitting is a mathematically-defined boundary box (or other quadrilateral or other geometric shape, depending on the particular implementation); and the scanning system 100 may then use this box to precisely define the boundaries of the document image 532 (see FIG. 5D) of the thumbnail image, so that the corresponding boundary of the document image 520 (see FIG. 5A) in the composite image 500 may be determined. The document scanning system 100 may then use the boundary of the document page image 520 to extract the image, the document page image 520 from the composite image 500 to derive a new composite image 590 (see FIG. 5K) in which the now extracted document image 592 is imposed on a uniform background (a white background and/or uniform background content 552, for example). This is an example of cropping. In accordance with further example implementations, the document scanning system 100 may perform operations other than cropping. For example, in accordance with further example implementations, the document scanning system 100 may perform other operations, such as scaling or deskewing the extracted document page image.

Figure 6:
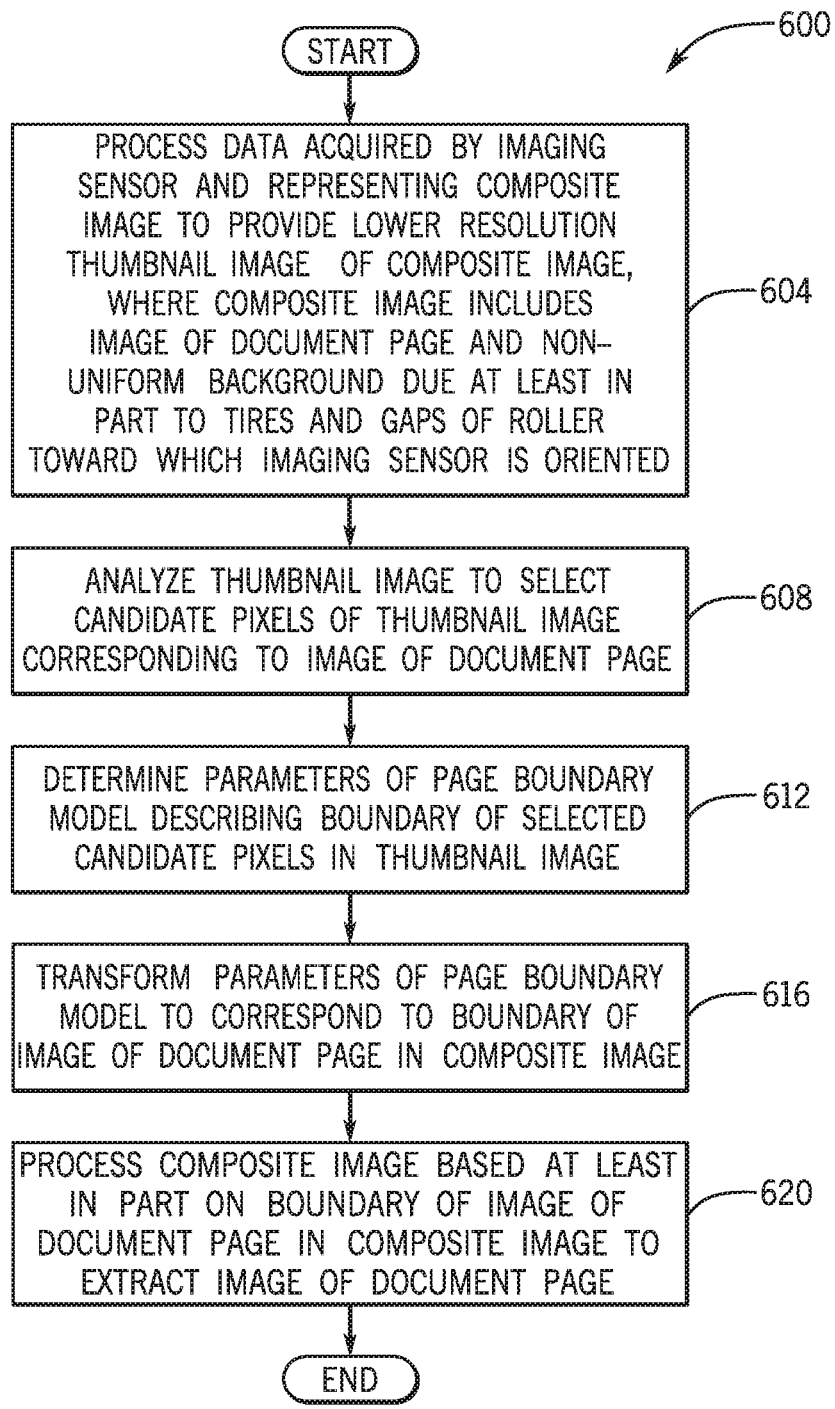

Thus, referring to FIG. 6, in accordance with example implementations, the scanning system 100 may perform a technique 600 that is illustrated in FIG. 6. Referring to FIG. 6, the technique 600 includes processing (block 604) acquired data representing a composite image, which includes an image of a document and a non-uniform background due at least in part to tires and gaps of the roller, to provide a lower resolution thumbnail image of the composite image. The technique 600 includes analyzing (block 608) the thumbnail image to select candidate pixels of the thumbnail image corresponding to the image of the document; determining (block 612) parameters of a page model describing the boundary of the selected candidate pixels of the thumbnail; transforming (block 616) the parameters of the page model to correspond to a boundary of the image of the document in the composite image; and using (block 620) the transformed parameters to extract the image of the document from the composite image.

Other implementations are contemplated, which are within the scope of the appended claims. For example, although implementations are described herein in which a document scanning system performs image processing to extract an image of a scanned document page, in accordance with further example implementations, a system other than a document scanning system may perform one or more of the techniques that are described herein to extract the document image. In this manner, in these implementations, one or multiple processors of a computing system (a desktop computer, tablet computer, laptop computer, and so forth) other than a document scanning system may receive image data from a document scanning system that represents a scanned composite image and perform the processing that is described herein.

As example of a further example implementation, for the implementations that are described above, processor(s) executing machine executable instructions perform the image processing. However, in accordance with further example implementations, dedicated hardware components may perform the image processing that is described herein.

While the present techniques have been described with respect to a number of embodiments, it will be appreciated that numerous modifications and variations may be applicable therefrom. It is intended that the appended claims cover all such modifications and variations as fall within the scope of the present techniques.

What is claimed is:

1. A method comprising:
acquiring data representing a first image produced by electronically scanning a page against a background, wherein the first image contains a non-uniform background content due at least in part to a variation introduced by the background being non-uniform; and extracting an image of the page from the first image, the extracting comprising:
processing the data representing the first image to generate second data representing a second image of the page and the background, the second image having a lower resolution than a resolution of the first image;
characterizing the background content of the first image by identifying the candidate pixels and determining the boundary of the page using the second image;
identifying candidate pixels associated with the page based at least in part on the characterized background content; and
based at least in part on the identified candidate pixels and a model for a boundary of the page, determining the boundary of the page.

2. The method of claim 1, wherein determining the boundary of the page comprises:
determining a boundary of the page in the second image; and
scaling the boundary of the page in the second image to determine the boundary of the page in the first image.

3. The method of claim 1, wherein identifying the candidate pixels comprises:
assigning degrees of page membership to the pixels based at least in part to the levels of dissimilarity of the pixels to the characterized background content to generate an image representing the page; and
filtering the image representing the page to generate an image representing the candidate pixels.

4. The method of claim 3, wherein filtering image representing the page comprises applying a morphological opening filter.

5. The method of claim 1, wherein determining the boundary of the page comprises:
using an image representing the identified candidate pixels, identifying coordinates of pixels following an approximation of a boundary for the page; and
refining the approximation based at least in part on a page boundary model and the identified coordinates.

6. The method of claim 1, wherein the non-uniform background content is due at least in part to a variation introduced by imaging against a segmented roller of an electronic scanning system.

7. The method of claim 1, further comprising:
processing the data representing the first image based at least in part on the determined boundary of the page, wherein processing the data representing the scanned image comprises cropping, deskewing or scaling pixels of the scanned image corresponding to the page.

8. An article comprising a non-transitory storage medium to store instructions that when executed by a computer cause the computer to:
process data representing a scanned composite image to generate second data representing a second image of the scanned composite image, the second image having a lower resolution than a resolution of the scanned composite image;
characterize a background content of the scanned composite image using the second image to determine a relatively coarse approximation of a boundary of a document image contained within the scanned composite image based at least in part on the characterization, wherein the background content is non-uniform due at least in part to a variation introduced by imaging against a non-uniform scanning background of a scanner;
refine the coarse approximation of the boundary of the document image based at least in part on a boundary model for the document image; and
based at least in part on a result of the refinement of the coarse approximation, extract the document image from the scanned composite image.

9. The article of claim 8, the storage medium storing instructions that when executed by the computer cause the computer to perform at least one of the following: deskew the document image, remove content outside of the determined boundary, crop the document image and scale the document image.

10. The article of claim 8, the storage medium storing instructions that when executed by the computer cause the computer to down sample the scanned composite image from a higher resolution to a lower resolution, and use the down sampled scanned composite image to estimate the coarse approximation of the boundary and refine the coarse approximation.

11. The article of claim 10, the storage medium storing instructions that when executed by the computer cause the computer to:
transform coordinates of the boundary associated with the down sampled scanned composite image to coordinates of the boundary associated with the scanned composite image to extract the document image from the scanned composite image.

12. A system comprising:
a roller to feed a document to be scanned, the roller comprising tires and gaps between the tires;
an imaging sensor oriented toward the roller to acquire data representing a composite image comprising an image of the document and a non-uniform background due at least in part to the tires and gaps of the roller; and
a processor to:
process the acquired data to provide a lower resolution thumbnail image of the composite image;
analyze the thumbnail image to select candidate pixels of the thumbnail image corresponding to the image of the document;
determine parameters of a page model describing a boundary of the selected candidate pixels of the thumbnail image;
transform the parameters of the page model to correspond to a boundary of the image of the document in the composite image; and
use the transformed parameters to extract the image of the document from the composite image.

13. The system of claim 12, further comprising:
an over scan sensor to detect a region of the composite image corresponding to the background, wherein the processor processes the thumbnail image to remove background content from the thumbnail image.

14. The system of claim 12, wherein the processor determines a background intensity as a function of pixel location, and the processor selects a given pixel to be a candidate pixel based at least in part on a comparison between an intensity of the given pixel and the background intensity for a pixel location of the given pixel location.

* * * * *